V. B. HAGG.
ELECTROLYTIC WATER PURIFIER.
APPLICATION FILED APR. 1, 1912.
1,038,122.
Patented Sept. 10, 1912.
3 SHEETS—SHEET 1.
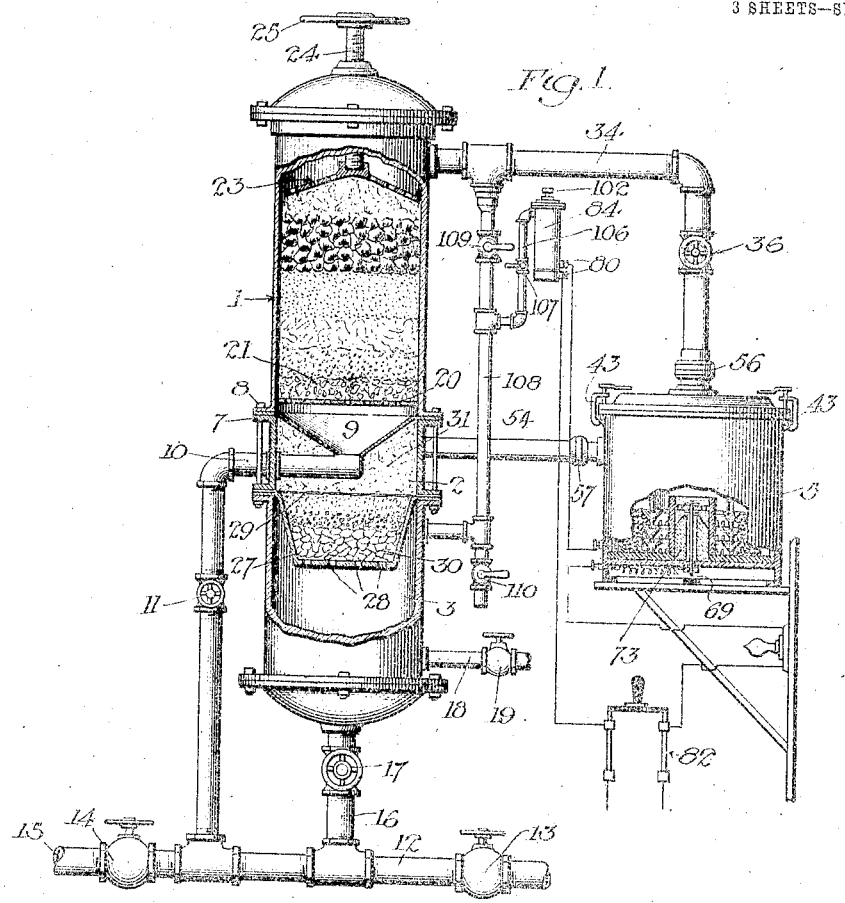

V. B. HAGG.
ELECTROLYTIC WATER PURIFIER.
APPLICATION FILED APR. 1, 1912.

1,088,122.

Patented Sept. 10, 1912.

3 SHEETS—SHEET 2.

Witnesses:

Inventor:
Virgil B. Hagg
Ryan & Haerley
Attys

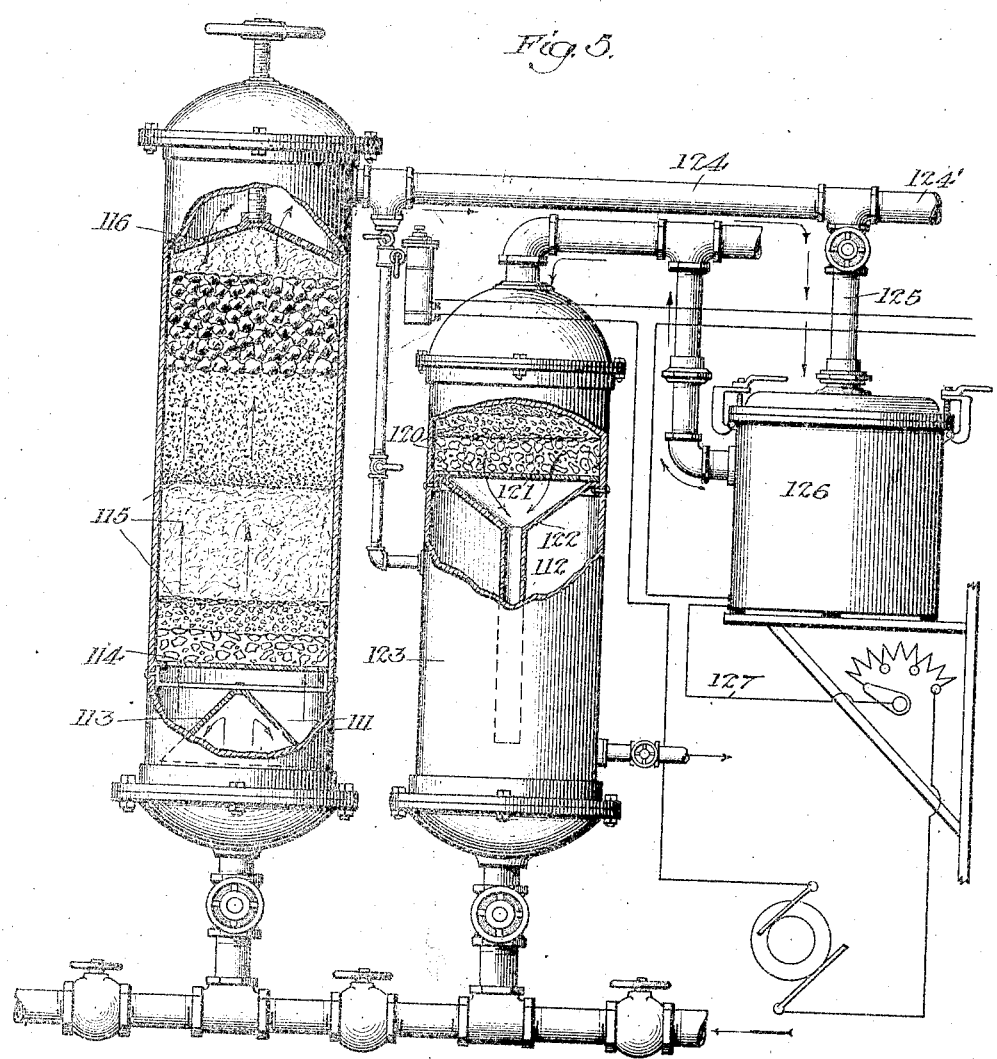

UNITED STATES PATENT OFFICE.

VIRGIL B. HAGG, OF LOS ANGELES, CALIFORNIA, ASSIGNOR TO CONTINENTAL WATER PURIFYING CORPORATION, OF LOS ANGELES, CALIFORNIA, A CORPORATION OF CALIFORNIA.

ELECTROLYTIC WATER-PURIFIER.

1,038,122.   Specification of Letters Patent.   Patented Sept. 10, 1912.

Application filed April 1, 1912. Serial No. 687,870.

*To all whom it may concern:*

Be it known that I, VIRGIL B. HAGG, a citizen of the United States, residing at Los Angeles, in the county of Los Angeles and State of California, have invented a new and useful Electrolytic Water-Purifier, of which the following is a specification.

This invention relates to a water purifier utilizing electrolytic action as a means of destroying the germs and rendering the organic impurities innocuous, and the main object of the present invention is to provide for application of the current in such manner as to give the most effective electrolytic germicidal and deodorizing action.

A further object of the invention is to reduce the expenditure of current energy to a minimum, thereby reducing the cost of maintenance of the apparatus.

Another object of the invention is to facilitate the cleaning of the purifying apparatus.

Other objects of the invention will appear hereinafter.

Figure 3:
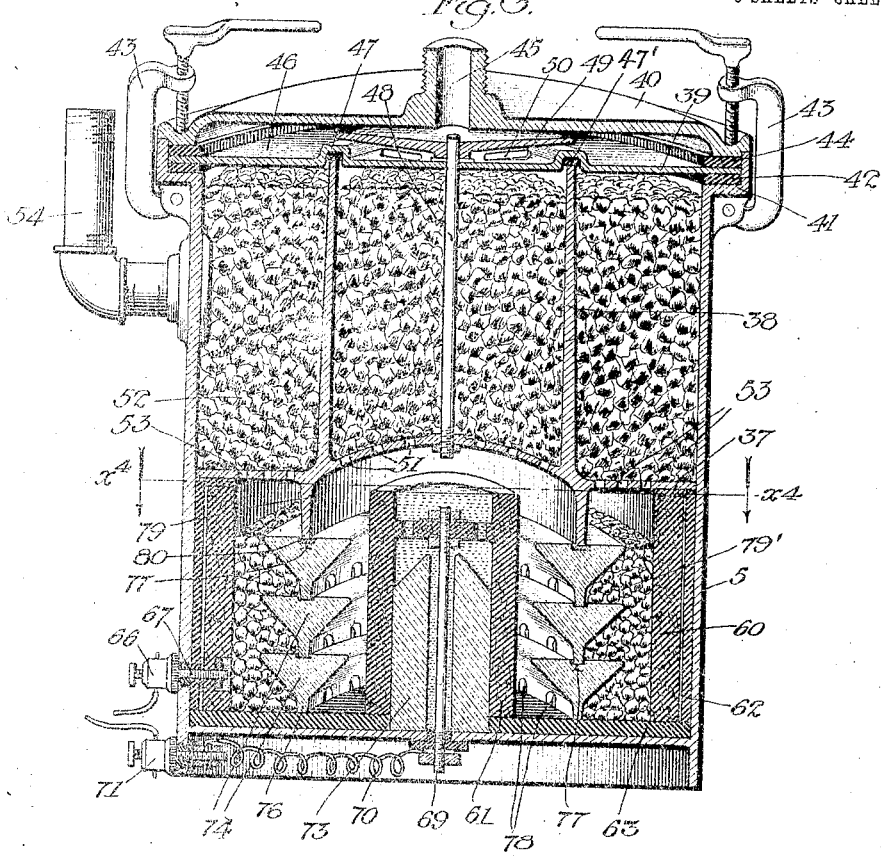
Figure 4:
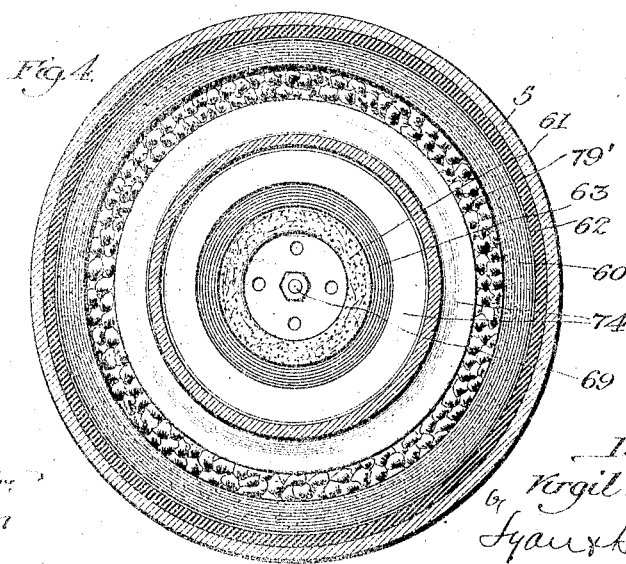

The accompanying drawings illustrate embodiments of the invention, and referring thereto:

Figure 1 is a side elevation of the apparatus with parts in section. Fig. 2 is a vertical section of the automatic circuit controller used in the apparatus, for cutting off the supply of current when it is not needed. Fig. 3 is a vertical section of an electrolytic device. Fig. 4 is a horizontal section on line $x^4$—$x^4$ in Fig. 3. Fig. 5 is a side elevation partly in section, showing a form of the invention in which means are provided for increased capacity, showing the method of uniting more than one electrolytic unit.

Referring to the simpler form of the invention shown in Fig. 1, the apparatus may comprise a preliminary filter chamber 1, a supplementary filter chamber 2, a receiving tank 3 for the filtered water, and an electrolytic device 5 connected to receive the water from the preliminary filtering chamber, and to deliver it to the supplementary filtering chamber after electrolytic action thereon.

The preliminary and supplementary filter chambers 1 and 2 and the receiving tank 3 may be formed as superimposed sections of a single cylindrical structure, these sections being fastened together by suitable means such as flanges 7 and bolts 8, the supplementary chamber 2 resting on top of the receiving tank 3 and the preliminary filter chamber 1 resting on top of the chamber 2 and being separated therefrom by a funnel-shaped bottom member 9 which communicates at its lower end with a pipe 10 communicating through valve 11 with the supply pipe 12 for the water to be purified. Said pipe 12 is provided with a valve 13 for controlling the water supply and with a valve 14 for controlling a discharge connection 15 independent of the filter. A pipe 16 leads from the pipe 12 to the bottom of the receiving tank 3 and is provided with a valve 17 for emptying the receiving tank when desired, through a waste outlet 15. The receiving tank 3 is provided with an outlet pipe 18 for filtered water having a valve 19.

The preliminary filter chamber 1 is provided near its lower end with a perforated false bottom 20 on which rests any desired filter bed 21 consisting, for example, of superimposed layers of gravel, sand and carbon, said bed being compressed to any desired extent by means of a follower plate 23 working vertically in the cylindrical chamber 1, and operated by a screw 24 having a handle 25. The supplementary filter chamber 2 is preferably provided with a dish-shaped bottom member 27 having perforations 28 in its bottom, and a perforated false bottom or partition 29 being provided above said bottom member 27, beds 30 and 31 of suitable filtering material being provided respectively within the bottom member 27 and within the filter chamber 2 above the false bottom 29.

The follower plate 23 in the filter chamber 1 is perforated for passage of water upwardly therethrough and the upper part of said filter chamber is connected by pipe 34 to the upper part of the electrolytic device 5, said pipe 34 including the valve 36. Said electrolytic device is preferably of the construction shown in Figs. 3 and 4, being divided into lower and upper chambers by a horizontal partition 37, having a tubular upward extension 38 on which rests a false top 39, the space between this false top and the top 40 of the member 5, constituting a water distributing space. The top 40 is preferably secured removably on the member 5, said member 5 having an outwardly extending flange 41 forming a horizontal shoulder on which rests a gasket 42, the plate 39 resting on said gasket and being held down by the top plate 40 which is held in position by screw clamps 43 and bears against a gasket 44 resting on the plate 39. An inlet 45 in the top member 40 communicates with the pipe 34 aforesaid and with the space 46 between the plate 39 and the top 40. Said plate 39 has an annular upward fold or ridge 47, the groove formed on the underside of this ridge receiving the top of the tubular extension 38 and forming a seat therefor a gasket 47' being interposed between said tubular extension 38 and plate 39 to give a water-tight joint and a deflector disk 49 resting on the plate 39 extends over said ridge 47 forming an annular water inlet between said ridge and disk. Said disk 49 is held in position by a bolt 48 extending through plates 37 and 39. The plate 39 is perforated as at 50 within said ridge for passage of water into the interior of the tubular extension 38 and the horizontal partition 37 is perforated as at 51 in that portion which is within said tubular extension to permit passage of water to the lower chamber of the electrolytic device. Said horizontal partition 37 is perforated as shown at 53 in that portion which is outside of the wall 38. The upper chamber of the electrolytic device surrounding the tubular extension 38 is a filtering and supplementary oxidizing chamber, being filled with carbon indicated at 52 in fragments or lumps so as to present a large surface and force the water to pursue a tortuous course in passing therethrough. A discharge pipe 54 leads from the upper part of the chamber 52 and communicates with the supplementary filter chamber 2. The pipes 34 and 54 preferably communicate with the respective inlet and outlet means for the electrolytic device 5 by means of unions indicated at 56 and 57 so as to facilitate removal and attachment of said device.

The electrolytic means proper is contained in the lower part or chamber of the casing 5 and comprises an outer electrode 60 formed, for example, as a ring of carbon and an inner electrode 61 formed as a carbon cylinder. The outer electrode 60 is supported and insulated by insulating sleeve 62 extending between said ring 60 and the wall of the casing 5 and by an insulating disk 63 extending between the said carbon ring 60 and the bottom of the casing 5. A terminal or binding post 66 is secured on and insulated from the casing 5 and electrically connected by a screw 67 to the outer electrode 60. The inner electrode 61 also rests on the insulating disk 63 and is retained in position by a bolt 69 which is insulated from the casing and is connected by a wire 70 to a binding post 71. A porcelain sleeve 73 may extend upwardly within the cylindrical inner electrode 61. Between the inner and outer electrodes are provided a plurality of rings 74 preferably of porcelain, arranged one above another in a stack, each ring being preferably formed with downwardly convergent inner and outer walls and terminating at its lower end in a rib or annular flange 76 fitting in a corresponding annular groove 77 in the top of the next lower ring, these annular ribs or flanges 76 being provided with perforations 78 for passage of the electrolyte therethrough. A downwardly extending annular flange 79 on the plate 37 aforesaid rests on a gasket 80 in the groove 77 of the top ring 74. Said flange 79 and the rings 74 divide the lower chamber into inner and outer compartments communicating only through the perforations 78 in the rings, the inner compartment communicating through perforations 51 with the water inlet means and the outer compartment communicating through perforations 53 with the water outlet means, so that in the operation of the filter a stream of water is forced from the inner compartment through the perforations 78 to the outer compartment. The space between the said rings 74 and the outer electrode 60 is packed with carbon preferably in lumps, indicated at 79.

Binding posts 80 are connected in an electric circuit consisting of wires 81 controlled by a main switch 82 and also controlled by an automatic switch 83, see Fig. 2, said switch 83 being contained within a casing 84, see Fig. 1, and being operated by or responsive to the pressure normally existing in the filtering apparatus so as to open the circuit upon cessation of such pressure due to cutting off the water supply. Said switch may be the ordinary snap switch of the usual construction and is operated, for example, by a bell-crank 86 having a slot 87 engaging with a pin 88 on the shaft 89 of the switch, one arm of said bell-crank being connected by a link 90 to a lever 91 which is pivotally connected to a rod 92 sliding through a fixed guide 93 and connected to one end of a lazy tongs 94, said lazy tongs being pivoted centrally at 96 and is connected at its other end to a rod 97 sliding through a false top 98 in the casing 84 and connected to a diaphragm 99 of rubber or other elastic material. Spring 100 engaging a collar 101 on a screw 102 adjustably supported at its upper end in a screw-cap 103, tends to press said diaphragm downwardly and collapse the lazy tongs, this action being reinforced by a spring 104 engaging with the lower end of the lazy tongs. The space between the false top 98 and the diaphragm 99 operates as a pressure chamber, being connected by a pipe 106 controlled by a valve 107 with a pipe 130

108 which communicates at one end with the storing tank 3 and at the other end with the pipe 34 leading from the upper filter chamber 1 to the electrolytic device, the connection from the pipe 108 to the pipe 34 being controlled by valve 109.

The operation is as follows: The water is supplied through valve 13 and pipe 12 to pipe 10, valve 17 being closed, valve 11 being open so that the water will flow to the funnel 5 at the bottom of the preliminary filter chamber. Passing up through the perforated plate 20, the water flows through the filter beds 21 and through the perforated plate 23 to the upper part of the tank 1, and thence out through the pipe 34; valve 36 being opened so that the water will pass to the chamber 46 at the top of the electrolytic device. From said chamber 46 water passes through perforations 50 to the interior of the tubular member 38 and then down through the perforations 51 to the electrolytic chamber, the water passing downwardly around the inner electrode 61, and then outwardly through the perforations 78 and the bed or packing 79′ of divided carbon and upwardly through the perforations 53 to the upper chamber 52. In its passage between the electrodes 60 and 61, the water is subjected to electrical action by current applied through the circuit 81 aforesaid. The nascent oxygen thereby generated in the water and the ionization of the water causes organic impurities therein to be broken up and destroyed in the usual and well known manner, the carbon of the organic matter in solution being consumed by the nascent oxygen, causing the water to be deodorized, disinfected and purified, and this operation is supplemented by the action of the carbon 79′ in the lower chamber and the carbon 52 in the upper chamber, subjecting the water to the catalytic action of the carbon in contact with oxygen, said oxygen being provided by the electrolytic action. In this way a more effective oxidizing result is produced than would be possible with either the electrolytic action or with the action of the carbon alone, by reason of the carbon being a supplementary porous medium for the retention of the nascent oxygen and exposing the organic matter in a thorough manner to the oxidational influence of this nascent oxygen. This carbon momentarily retards the reuniting of the hydrogen and oxygen ions, thus creating a prolonged oxidational action of the nascent oxygen. From the upper chamber of the electrolytic device, the water passes through pipe 54 to the filter chamber 2 and thence down through the filter bed 31, perforated plate 29 and filter bed 30, and through the perforations 28 into the storage reservoir or tank 3, whence it may be withdrawn whenever required, or continuously through pipe 18, opening valve 19. It will be noted that the filtering operation in the preliminary filter chamber 1 is effected with upward movement of the water, thereby utilizing gravity as a resistance to hold back the solid particles.

The electrolytic circuit is normally maintained closed by the automatic switch 83, the valve 107 being opened so that pressure from the filtering apparatus is communicated to the chamber 105 in the top of the casing 84, causing the lazy tongs 94 to be collapsed, the switch being then in closed position. On drawing off the water, for example, by the valve 19, the pressure in the filter and in the pipe 108 connected thereto is reduced so that the toggle is allowed to expand under the action of the springs 100 and 104 thereby causing the switch to be closed through the operation of the connections 86, 88, 90 and 91, the slotted bell-crank 86 allowing the switch to move rapidly to closed position, said switch being a snap-switch as above stated.

When it is desired to clean the filter, valves 13, 36 and 107 may be first closed. Pressure plate 23 is released and valves 11, 14 and 109 are opened. This permits the filtered water in the upper part of the reservoir 1 to flow downward through the lower strata 21 carrying the impurities through exit pipe 15. The valve 109 allows air from reservoir 3 to enter with more or less pressure, accelerating the gravity flow in reservoir 1, at the same time preventing any resistance to the flow by vacuum suction.

In the form of the invention shown in Fig. 5, the preliminary filter chamber 111 and the supplementary filter chamber 112 consist of separate casings. The preliminary filter chamber in this case is provided with a deflector 113 at the lower portion thereof for spreading the water, the water passing upwardly from said deflector through a perforated plate 114 and filter beds 115 and perforated pressure plate 116 at the top of said cylinder, and the supplementary filter chamber 112 is provided with filter beds 120 supported on a perforated plate 121 above a funnel 122 which drains into the storage tank 123 in the casing 112. The delivery pipe 124 from the preliminary filter chamber communicates in this case through a pipe 125 with the casing 126 for the electrolytic device, the pipe 124 being extended as shown at 124′ so as to communicate with any desired number of electrolytic devices. The electrical circuit 127 is also extended in this case to connect with as many electrolytic devices as may be used in the plant, the construction in this figure being especially adapted to a series of electrolytic units supplied by a single preliminary filter and discharging to a single supplementary filter.

What I claim is:

1. In a water purifier, a chamber containing two electrodes and wall means between said electrodes having perforations therethrough for passage of the electrolyte, said wall means being provided with projecting portions above said perforations, said chamber having a top member provided with a flange forming a part of said wall means, said wall means dividing the said chamber into inner and outer compartments and said top member being provided with inlet means within said flange and with outlet means at the outside of said flange.

2. In an electrolytic water purifying apparatus, a chamber, a central electrode in said chamber, an outer annular electrode and a plurality of insulating rings interposed between said electrodes, said rings being downwardly convergent and having perforated ribs at their lower portions, said chamber having a top member provided with a downwardly extending flange making a tight joint with the uppermost of said rings, said top member being provided with water inlet means at the inside of said flange and with water outlet means at the outside of said flange.

3. In a water purifier, a chamber containing two electrodes, wall means between said electrodes having perforations therethrough for passage of the electrolyte, said wall means being provided with projecting portions above said perforations, and carbon in a divided condition in the space between said rings and the outer electrode.

4. In a water purifier, a casing, a horizontal partition member dividing said casing into upper and lower chambers, a vertical tubular member extending upwardly from said partition and dividing the upper chamber into inner and outer compartments, water inlet means communicating with said inner compartment of the upper chamber at the upper end thereof, water outlet means communicating with the outer compartment of said upper chamber, filtering material in each of said compartments, a flange extending downwardly from said horizontal partition into the lower chamber, insulating rings in said lower chamber superimposed on to one another and forming in conjunction with said last named flange, a wall means dividing the lower chamber of the casing into inner and outer compartments, said rings being perforated to establish communication between said inner and outer compartments and having projecting portions above said perforations extending into the inner and outer compartments, an electrode in the inner compartment, an electrode in the outer compartment surrounding said rings, said horizontal partition being provided with perforations establishing communication between the upper and lower inner compartments and with perforations establishing communication between the lower and upper outer compartments.

In testimony whereof, I have hereunto set my hand at Los Angeles, California, this 22nd day of March, 1912.

VIRGIL B. HAGG.

In presence of—
ARTHUR P. KNIGHT
F. A. CRANDALL